US009383952B1

(12) United States Patent
Kramer

(10) Patent No.: US 9,383,952 B1
(45) Date of Patent: Jul. 5, 2016

(54) SYSTEMS AND METHODS FOR OVERRIDING A PRINT TICKET WHEN PRINTING FROM A MOBILE DEVICE

(71) Applicant: Xerox Corporation, Norwalk, CT (US)

(72) Inventor: Roger T. Kramer, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/661,404

(22) Filed: Mar. 18, 2015

(51) Int. Cl.
*G06F 3/12* (2006.01)

(52) U.S. Cl.
CPC ............ *G06F 3/1208* (2013.01); *G06F 3/1228* (2013.01); *G06F 3/1253* (2013.01); *G06F 3/1255* (2013.01); *G06F 3/1292* (2013.01)

(58) Field of Classification Search
CPC ... G06F 3/1208; G06F 3/1255; G06F 3/1292; G06F 3/1253; G06F 3/1228
USPC ........ 358/1.15, 1.11, 1.13, 1.6, 1.9, 1.1, 1.14, 358/1.18, 3.09, 3.28; 709/203, 220; 379/265.11
See application file for complete search history.

(56) References Cited

U.S. PATENT DOCUMENTS

| | | | |
|---|---|---|---|
| 5,619,649 A | 4/1997 | Kovnat et al. | |
| 6,833,925 B1 * | 12/2004 | Igoe | G06F 3/1205 235/375 |
| 6,975,419 B2 | 12/2005 | Staas et al. | |
| 7,190,471 B2 * | 3/2007 | Sandfort | G06F 3/1204 358/1.14 |
| 7,409,452 B2 | 8/2008 | Ragnet et al. | |
| 8,248,637 B2 | 8/2012 | Dolan et al. | |
| 8,320,008 B2 | 11/2012 | Jahn | |
| 8,665,461 B2 * | 3/2014 | Salgado | G06F 3/1205 358/1.13 |
| 8,684,264 B2 | 4/2014 | Yu et al. | |
| 8,711,407 B2 * | 4/2014 | Partridge | G06F 21/608 358/1.14 |
| 8,823,970 B2 | 9/2014 | Morales et al. | |
| 2003/0167271 A1 | 9/2003 | Arnold et al. | |
| 2004/0001217 A1 | 1/2004 | Wu | |
| 2008/0106755 A1 * | 5/2008 | Morooka | G06F 3/1204 358/1.15 |
| 2010/0214598 A1 * | 8/2010 | Hoppenot | G06F 3/1205 358/1.15 |
| 2010/0302568 A1 * | 12/2010 | Kouguchi | H04N 1/00204 358/1.9 |
| 2011/0085196 A1 | 4/2011 | Liu et al. | |
| 2011/0242558 A1 * | 10/2011 | Usui | G03G 15/5087 358/1.9 |
| 2011/0242581 A1 * | 10/2011 | Lee | G06F 3/122 358/1.15 |
| 2011/0255110 A1 * | 10/2011 | d'Entrecasteaux | G06F 3/122 358/1.13 |
| 2012/0094716 A1 * | 4/2012 | Reeves | G06F 3/1204 455/557 |
| 2012/0212775 A1 * | 8/2012 | Jahn | G06F 3/1205 358/1.15 |
| 2012/0300245 A1 * | 11/2012 | Chatierjee | H02J 5/005 358/1.14 |
| 2012/0320419 A1 * | 12/2012 | Ito | G06F 3/1288 358/1.15 |
| 2013/0038896 A1 | 2/2013 | Nalewajek | |
| 2013/0100486 A1 * | 4/2013 | Mccoog | G06F 3/1204 358/1.15 |

(Continued)

*Primary Examiner* — Negussie Worku
(74) *Attorney, Agent, or Firm* — Gibb & Riley, LLC

(57) ABSTRACT

Systems and methods are disclosed for overriding a print ticket. An electronic document for printing on a target image output device is identified on a portable computing device. Printing and finishing instructions are selected, based on capabilities of the target device. A request to convert the electronic document to a printable format is transmitted to a separate document conversion service. The electronic document in the form of a printable document having a generic print ticket is received from the document conversion service. The generic print ticket is evaluated, based on the printing and finishing instructions selected for the target device. The generic print ticket is removed from the printable document and a corrected print ticket is produced based on the printing and finishing instructions selected for the target device. The corrected print ticket is injected into the printable document and transmitted from the portable computing device to the target device.

20 Claims, 5 Drawing Sheets

(56) References Cited

U.S. PATENT DOCUMENTS

| | | | | |
|---|---|---|---|---|
| 2013/0155464 A1* | 6/2013 | Bearchell | ............ | G06F 3/1206 358/1.15 |
| 2013/0201494 A1* | 8/2013 | Sweet | ................... | G06F 3/1206 358/1.9 |
| 2013/0229679 A1* | 9/2013 | Kamath | ............... | G06F 3/1207 358/1.15 |
| 2013/0308772 A1* | 11/2013 | Rodriguez Marchant | ................. | H04L 9/28 380/28 |
| 2014/0036296 A1* | 2/2014 | Armstrong | ............ | G06F 3/1208 358/1.14 |
| 2015/0036175 A1* | 2/2015 | Yun | ....................... | G06F 3/1212 358/1.15 |

\* cited by examiner

SYSTEMS AND METHODS FOR OVERRIDING A PRINT TICKET WHEN PRINTING FROM A MOBILE DEVICE

BACKGROUND

Systems and methods herein generally relate to machines having print engines such as printers and/or copier devices and, more particularly, to specifying print and finishing options when printing from a mobile device.

Conventional digital reprographic systems receive electronic image(s), which are passed to an image-processing unit. The image-processing unit may be a combination of software and hardware elements that accepts the electronic images from different sources and performs operations needed to convert the images to the format compatible with the output path of the digital reprographic system.

Mobile users may want to specify/override print options (copies, orientation, page size, color/b&w, etc.) for documents from a mobile device. Current conversion services may attempt to insert and/or preserve print ticket operations or bind print tickets to print jobs using cloud servers and or other hosted services. These may not match what is necessary/desired to print to a particular target image output device.

For example, in the current art, one method of printing from mobile devices involves using a conversion service to convert an electronic document into a printable format and either returning that document to the mobile device, or printing it from the conversion service itself. Using a conversion service allows the mobile user to print many types of documents to many types of printing devices without having to have specialized print drivers developed for and installed on the mobile device. These conversion services may attempt to insert and/or preserve print ticket operations or bind the print ticket to the print jobs using cloud servers and/or other hosted services. In the case of having the print service send the document directly to the printing device, there may barriers to accessing the desired printing device (firewalls, etc.).

None of these methods is sufficient when the mobile application requires a set of options that are supported by the target printing device, but are not a subset of the options provided by the aforementioned services. Additionally, conversion and off-line storage services often do not have information about the specific printing devices targeted by the mobile user, and may not be able to provide all options, or the correct syntax and format for the print ticket.

SUMMARY

In one aspect of the systems and methods disclosed herein, a method for injecting a valid print ticket into a print stream or replacing the print ticket provided by intermediate services is described, such that the mobile device user is assured that the desired options, and only the desired options, are submitted to the printing device or multi-function device (MFD). The mobile application can also insure that the print ticket is in the correct format for the targeted device.

According to methods herein, an electronic document for printing on a target image output device is identified using a portable computing device. Printing and finishing instructions for the electronic document are selected on the portable computing device, based on capabilities of the target image output device. A request to convert the electronic document to a printable format is transmitted to a separate document conversion service. The electronic document in the form of a printable document having a generic print ticket is received from the document conversion service. The generic print ticket is evaluated on the portable computing device, based on the printing and finishing instructions selected for the target image output device. The generic print ticket is removed from the printable document. A corrected print ticket is produced with the portable computing device, for the printable document based on the printing and finishing instructions selected for the target image output device. The corrected print ticket is injected into the printable document using the portable computing device. The printable document with the corrected print ticket is transmitted from the portable computing device to the target image output device.

According to other methods herein, a portable computing device is operatively connected to a separate document conversion service. An application on the portable computing device is operated to identify an electronic document for printing on a target image output device. Printing and finishing instructions for the electronic document are selected, using the application, based on capabilities of the target image output device. The portable computing device is caused to transmit the electronic document to the separate document conversion service, using the application. The electronic document is received from the separate document conversion service as a printable document into a graphic user interface of the portable computing device, using the application. The printable document has a generic print ticket. The generic print ticket is evaluated, using the application, based on the printing and finishing instructions selected for the target image output device. The generic print ticket is removed from the printable document. A corrected print ticket for the printable document is produced, using the application, based on the printing and finishing instructions selected for the target image output device. A print file is created, using the application operating on the portable computing device, by combining the printable document and the corrected print ticket. The print file has a file format usable by the target image output device. The print file is transmitted from the portable computing device to the target image output device, using the application. The target image output device is caused to print the print file, using the application.

According to portable computing devices, a processor operates an application. A graphic user interface is operatively connected to the processor. The portable computing device includes an input/output connection connected to the processor. The input/output connection operatively connects the portable computing device to a separate document conversion service. The application enables identification of an electronic document for printing on a target image output device, using the graphic user interface. The application enables selection of printing and finishing instructions for the electronic document based on capabilities of the target image output device. The application causes the portable computing device to transmit the electronic document to the separate document conversion service. The graphic user interface receives the electronic document as a printable document from the separate document conversion service. The printable document has a generic print ticket. The application evaluates the generic print ticket based on the printing and finishing instructions selected for the target image output device. The application removes the generic print ticket from the printable document. The application produces a corrected print ticket for the printable document based on the printing and finishing instructions selected for the target image output device. The application creates a print file by combining the printable document and the corrected print ticket. The print file has a file format usable by the target image output device. The application causes the portable computing device to transmit the print file to the target image output device. The application causes the target image output device to print the print file.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
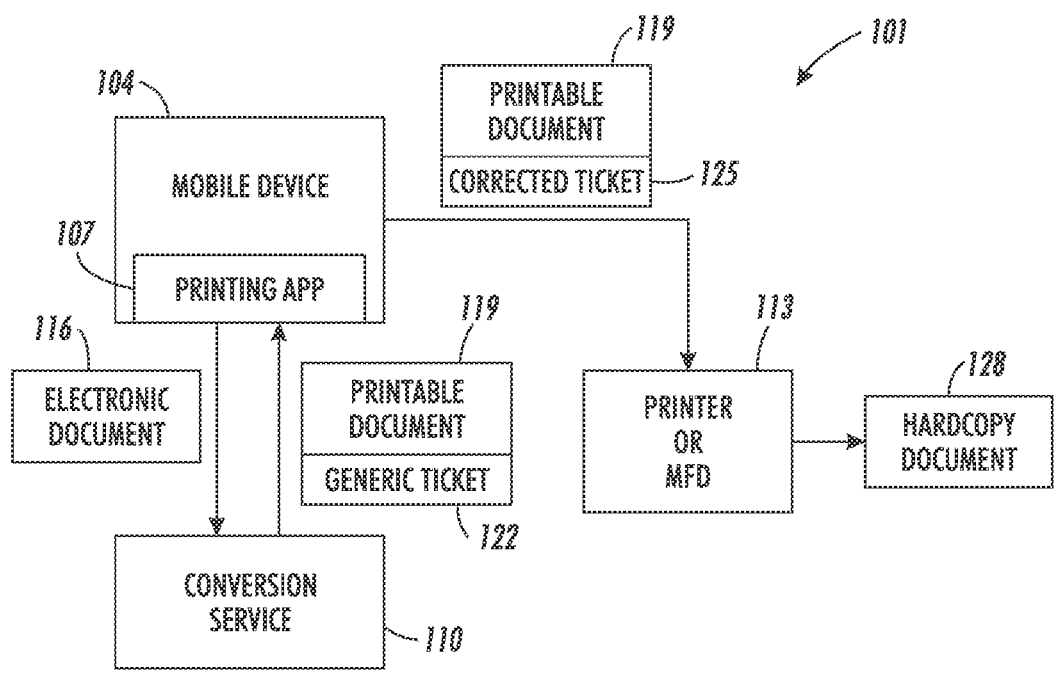
FIG. 1 is a functional block diagram illustrating a broad overview of systems and methods herein.

The disclosure will now be described by reference to a mobile device that includes a printing application. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

Referring to FIG. 1, the system, indicated generally as 101, includes a mobile device 104 with an installed mobile printing application 107. The printing application is of the type that can access either an external document repository, and external conversion service, or both. The system 101 also includes a document storage and/or conversion service 110 and a printer or multi-function device (MFD) 113.

Functionally, a user may have an electronic document 116 on a mobile device 104. The user may want to print a hardcopy version of the document on the MFD 113. In order to accomplish this, the user executes the mobile printing application 107, and selects the electronic document 116 to print. The user also selects desired print/finishing options. (Note: the electronic document 116 may reside on the mobile device 104; however, it is contemplated that the electronic document 116 may reside in a repository external to the mobile device 104). The mobile printing application 107 requests the conversion service 110 to convert the electronic document 116 to a printable document 119 in a specific format (e.g., convert a Microsoft Word document to PostScript). The conversion service 110 returns the printable document 119 (in electronic form), with a generic print ticket 122, which may be a default or customized print ticket based on the capability of the conversion service 110. The mobile printing application 107 analyzes the printable document 119 and detects that the generic print ticket 122 is not aligned with the options selected by the user, above. The mobile printing application 107 examines the format of the printable document 119, and performs the following steps:

a. Detects the information associated with the generic print ticket 122 in the converted document (i.e., the printable document 119).
    b. Removes the generic print ticket 122 provided by the conversion service 110.
    c. Converts the user-selected print/finishing options into a corrected print ticket 125 for the given printable format and target device (MFD 113).
    d. Injects the corrected print ticket 125 into the proper location in the printable document 119.

The mobile printing application 107 then completes sending the printable document 119 with a corrected print ticket 125 to the target device (MFD 113), which creates a hardcopy printed document 128. The hardcopy printed document 128 is created with selected orientation, finishing options, etc.

It is contemplated that the connection between the mobile device 104 and the conversion service 110 may include a wired or a wireless connection. Furthermore, the mobile printing application 107 can send the printable document 119 with the corrected print ticket 125 to the target device (MFD 113) using a wired or wireless transmission path.

Figure 2:
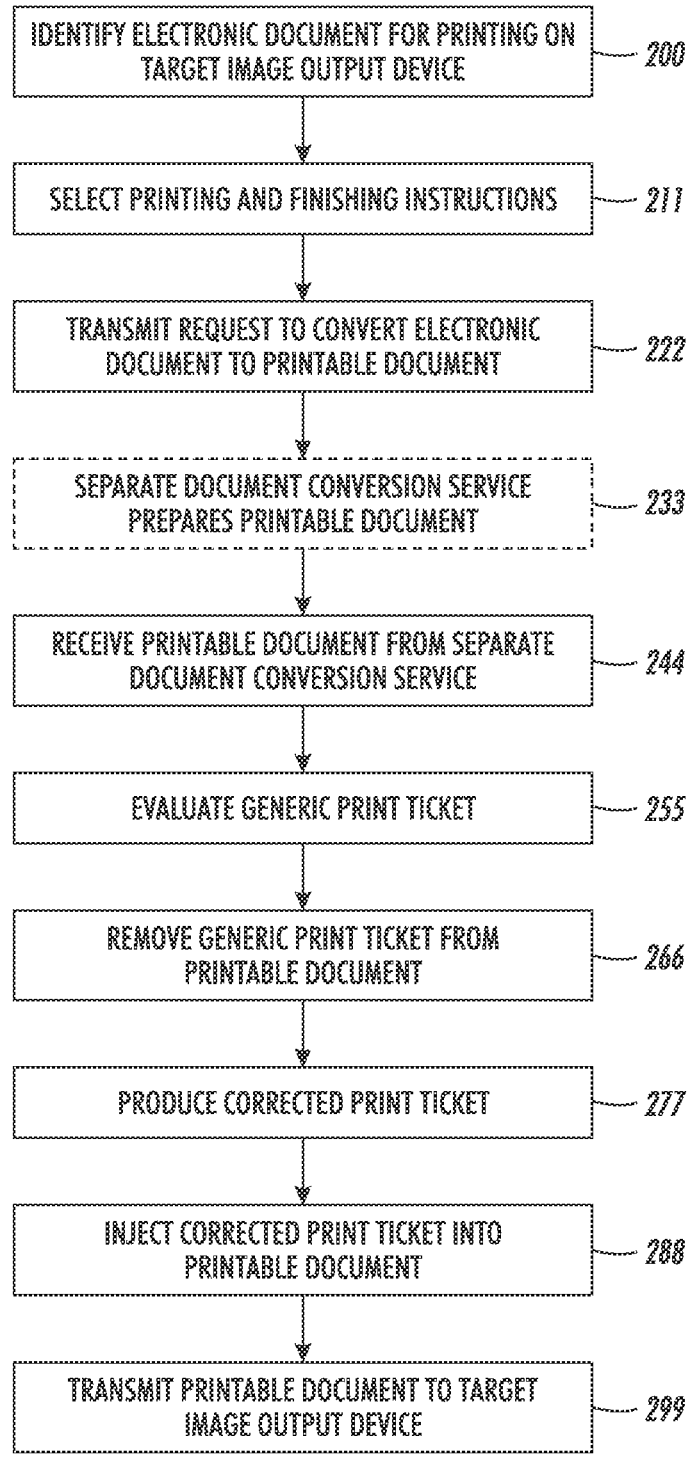
FIG. 2 is a flow diagram illustrating methods herein.

FIG. 2 is a flow diagram illustrating the processing flow of an exemplary method according to systems and methods herein. At 200, an electronic document for printing on a target image output device is identified using a portable computing device. At 211, printing and finishing instructions for the electronic document are selected on the portable computing device, based on capabilities of the target image output device. At 222, a request to convert the electronic document to a printable document in a specific printable format is transmitted from the portable computing device to a separate document conversion service. As indicated at 233, the separate document conversion service prepares a printable document. The printable document includes a generic print ticket. At 244, a printable document having the generic print ticket is received from the separate document conversion service. The generic print ticket is evaluated on the portable computing device, based on the printing and finishing instructions selected for the target image output device, at 255. At 266, the generic print ticket is removed from the printable document. At 277, a corrected print ticket is produced with the portable computing device, for the printable document based on the printing and finishing instructions selected for the target image output device. At 288, the corrected print ticket is injected into the printable document, using the portable computing device. The printable document with the corrected print ticket is transmitted from the portable computing device to the target image output device, at 299.

Figure 3:
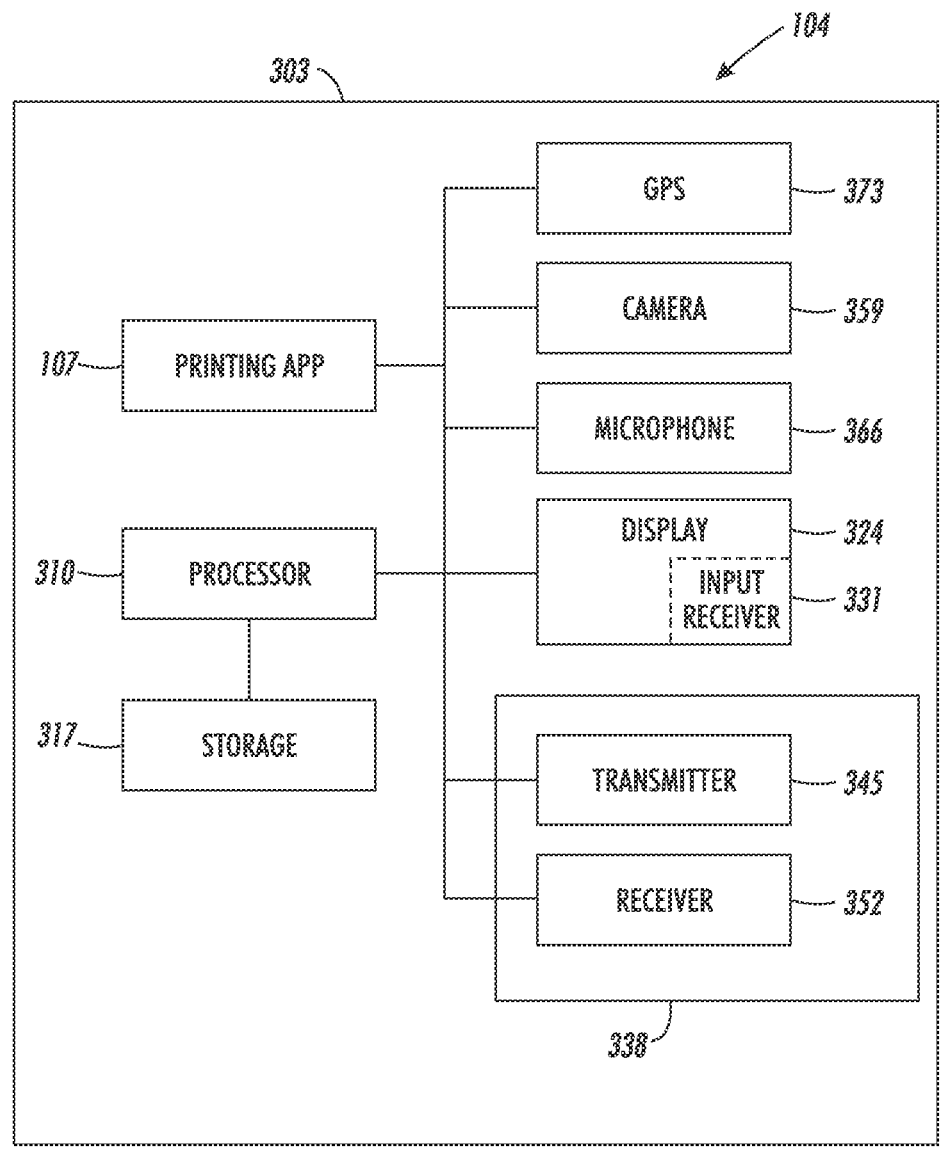
FIG. 3 is a block diagram of a mobile device according to systems and methods herein.

FIG. 3 shows a block diagram of a mobile device 104 according to systems and methods herein. The mobile device 104 contains several components enclosed in a housing 303. The housing 303 contains a processor 310 operatively connected to a storage device 317. The storage device 317 has program code embodied therewith, which program code is readable and executable by the processor 310, as described in further detail below.

It should be understood that the processor 310 as used herein comprises a computerized device adapted to perform (i.e., programmed to perform, configured to perform, etc.) the below described system operations. According to systems and methods herein, the processor 310 comprises a programmable, self-contained, dedicated mini-computer. The details of such computerized devices are not discussed herein for purposes of brevity and reader focus.

The mobile device 104 includes a display device 324 that can provide a user interface (UI) and can function as the main control interface for the mobile device 104. The display device 324 may be a graphic user interface comprising a touch-enabled screen, which will be the main go-to point for user interaction with the mobile device 104. The display device 324 should be appropriately sized for a smartphone or tablet device.

The display device 324 may include an input receiver 331 operatively connected to the processor 310. The input receiver 331 receives selection of a selected application to be performed by the processor 310. For example, a user may enter the mobile printing application 107 by selecting an appropriate icon on the user interface. A user may select the electronic document 116 to print and the desired print/finishing options using the input receiver 331 of the display device 324.

As shown in FIG. 3, the mobile device 104 further includes an input/output connection, such as communications device 338 having a transmitter 345 and a receiver 352. The transmitter 345 is operatively connected to the processor 310. The transmitter 345 transmits electromagnetic signals to a recipient, such as transmitting the electronic document 116 to the conversion service 110 or transmitting the printable document 119 with a corrected print ticket to the target device (MFD 113). The receiver 352 is operatively connected to the processor 310. The receiver 352 receives electromagnetic signals into the mobile device 104, such as the printable document 119 received from the conversion service 110. The communications device 338 may be capable of a variety of communication techniques using wired or wireless technology.

A camera 359 or other image acquisition device operatively connected to the processor 310 may also be included in the mobile device 104. Additionally, the mobile device 104 may include a phone application 366, a GPS application 373, etc., which may be operatively connected to the processor 310.

According to systems and methods herein, the mobile device 104 may comprise a smartphone or computer tablet. Smartphone and tablet devices commonly include input/output devices, power supplies, processors, electronic storage memories, wiring, etc., the details of which are omitted herefrom to allow the reader to focus on the salient aspects of the systems and methods described herein.

In some cases, the conversion service 110 may supply no print options. For example, the conversion service 110 may convert an electronic document 116 from MS Office format to a printable document 119 in PDF format. Many printers can print PDF documents natively. However, if the conversion service 110 does not provide print options, the mobile printing application 107 can override the defaults that the target printing device (MFD 113) would normally use by injecting a print ticket into the printable document.

Another alternative is to remove the print ticket that has been included in the converted document. In this case, the user may want to use the defaults for the target printing device (MFD 113), or may be able to set printing options at the MFD 113. Therefore, the user desires to remove all print ticket information, while maintaining the document in the correct format for the target printing device (MFD 113).

In some cases, the mobile device 104 does not require a conversion service 110, as the electronic document 116 may already be in a printable format. Nevertheless, in such case, the electronic document 116 may require a print ticket to be injected, replaced, or removed.

In other words, a system and method for specifying print and finishing options when printing from a mobile device is disclosed. A printing application on the mobile device can be used to attach or replace a print job ticket that is conformant to the targeted print device. When a document conversion service converts an electronic document from a mobile device, the document is made available in printable form. The document conversion service will usually embed a job ticket on the document. According to systems and methods herein, the mobile device replaces the job ticket with the user's desired print and finishing options before submission to the targeted print device. These steps can also occur when the conversion service does not provide a job ticket. That is, the disclosed method introduces an intermediate step when printing from a mobile device, which will circumvent the job ticket provided by the document conversion service. In particular, the method intelligently replaces the existing print and finishing options in the mobile printable file after conversion.

Figure 4:
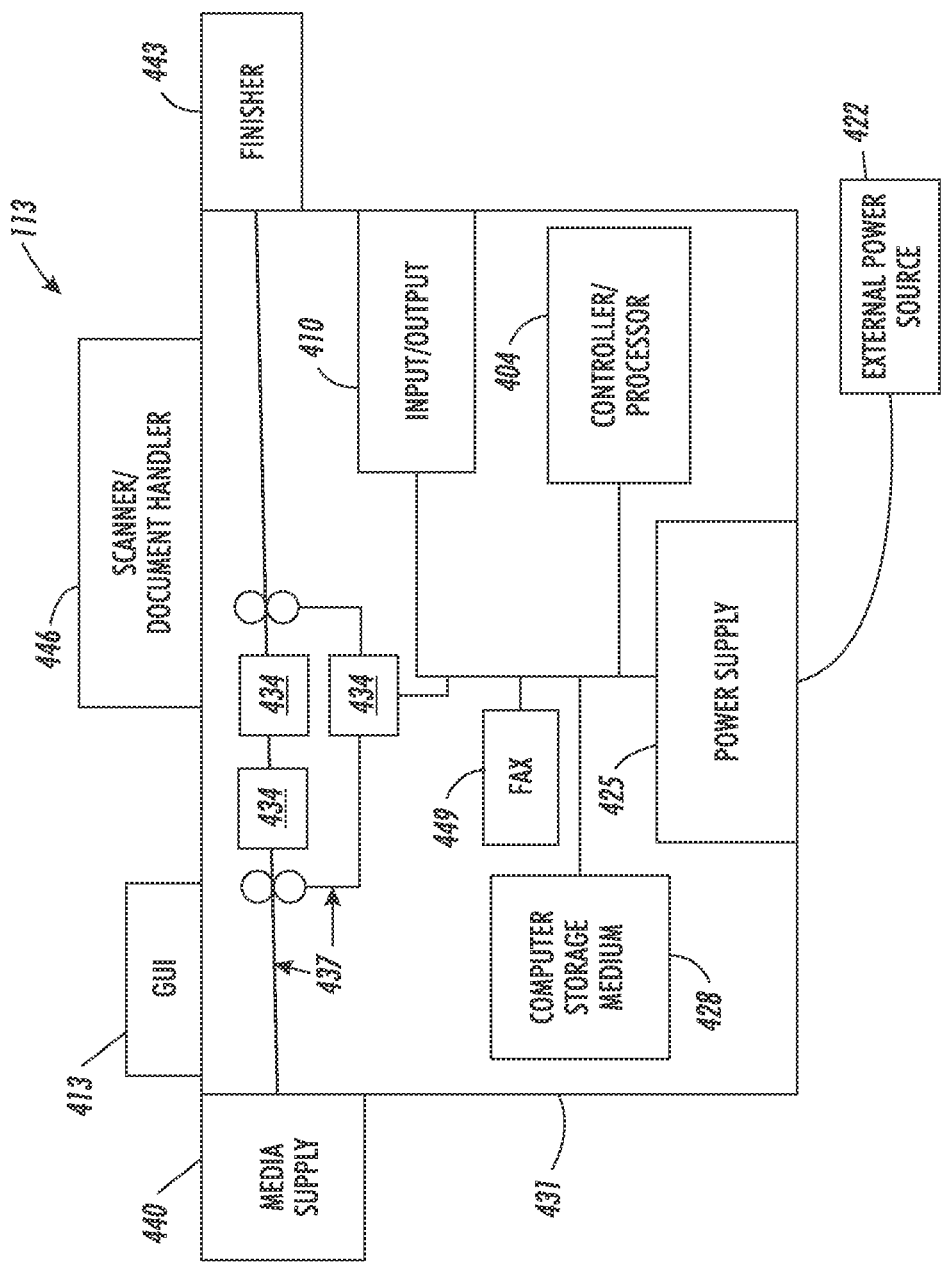
FIG. 4 is a side-view schematic diagram of a multi-function device according to systems and methods herein.
Figure 5:
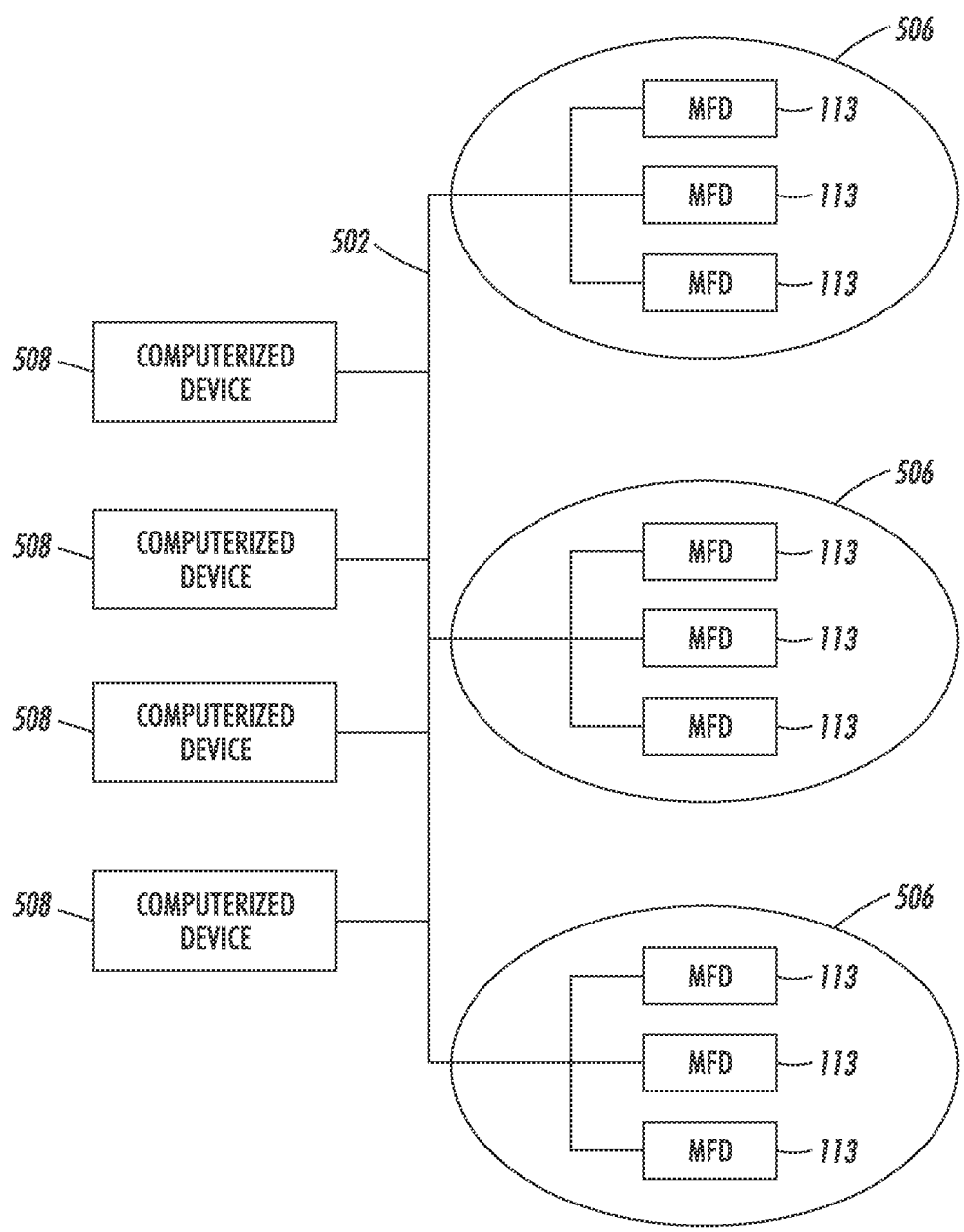
FIG. 5 is a schematic diagram illustrating systems and methods herein.

FIG. 4 illustrates a multi-function device 113 that can be used with systems and methods herein and can comprise, for example, a printer, copier, fax machine, etc. The multi-function device 113 includes a controller/processor 404 and an input/output device 410 operatively connected to the controller/processor 404. As described above, the controller/processor 404 may be connected and to a computerized network 502 external to the multi-function device 113 through a communications port of the input/output device 410, such as shown in FIG. 5, described below. In addition, the multi-function device 113 can include at least one accessory functional component, such as a graphic user interface assembly (GUI) 413. The GUI 413 operates on power supplied from an external power source 422. The external power source 422 may provide electrical power through the power supply 425.

The input/output device 410 is used for communications to and from the multi-function device 113. The controller/processor 404 controls the various actions of the multi-function device 113. A non-transitory computer storage medium 428 (which can be optical, magnetic, capacitor based, etc.) is readable by the controller/processor 404 and stores instructions that the controller/processor 404 executes to allow the multi-function device 113 to perform its various functions, such as those described herein.

According to systems and methods herein, the controller/processor 404 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 113 is special purpose machine that includes a specialized image processing card having unique ASICs for providing image processing instructions, includes specialized boards having unique ASICs for input and output devices to speed network communications processing, a specialized ASIC processor that performs the logic of the methods described herein using dedicated unique hardware logic circuits, etc. It is contemplated that the controller/processor 404 may comprise a raster image processor (RIP). A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 4, a device housing 431 has one or more functional components that operate on power supplied from the external power source 422, which may comprise an alternating current (AC) power source, through the power supply 425. The power supply 425 can comprise a power storage element (e.g., a battery) and connects to the external power source 422. The power supply 425 converts the external power into the type of power needed by the various components of the multi-function device 113.

The multi-function device 113 may include at least one marking device 434 (sometimes referred to as printing engines) operatively connected to the controller/processor 404, a media path 437 positioned to supply sheets of media from a media supply 440 to the marking device(s) 434, etc., along the media path 437. After receiving various markings from the printing engine(s), the sheets of media can optionally pass to a finisher 443 which can fold, staple, sort, etc., the various printed sheets. In addition, the multi-function device 113 can include at least one accessory functional component (such as a scanner/document handler 446, fax module 449, etc.) that also operates on the power supplied from the external power source 422 (through the power supply 425). The fax module 449 may operate in conjunction with the scanner/document handler 446.

The scanner/document handler 446 may be any image input device capable of obtaining information from an image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the art, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

As would be understood by those ordinarily skilled in the art, the multi-function device 113 shown in FIG. 4 is only one example and the systems and methods herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with systems and methods herein.

As shown in FIG. 5, exemplary printers, copiers, multi-function machines, and multi-function devices (MFD) 113 may be located at various different physical locations 506.

Other devices according to systems and methods herein may include various computerized devices 508. The computerized devices 508 can include print servers, printing devices, personal computers, etc., and are in communication (operatively connected to one another) by way of a network 502. The network 502 may be any type of network, including a local area network (LAN), a wide area network (WAN), or a global computer network, such as the Internet.

The hardware described herein plays a significant part in permitting the foregoing method to be performed, rather than function solely as a mechanism for permitting a solution to be achieved more quickly, (i.e., through the utilization of a computer for performing analysis and calculations). For example, these methods allow a mobile user to print many types of documents to many types of printing devices without requiring specialized print drivers developed for and installed on the mobile device. Therefore, such processes as removing a generic print ticket, creating a corrected print ticket, and injecting the corrected print ticket into an appropriate location in a printable document require the use of a computerized image processor to both access the document and to process the document.

As would be understood by one ordinarily skilled in the art, the processes described herein cannot be performed by human alone (or one operating with a pen and a pad of paper) and instead such processes can only be performed by a machine. Specifically, processes such as printing, electronically altering print tickets using a document conversion service, etc., require the utilization of different specialized machines. Therefore, for example, the production of a corrected print ticket based on specific finishing instructions associated with a target image output device, removing a generic print ticket and injecting the corrected print ticket into the correct location in the printable document, and printing the document, which are performed by the devices herein, cannot be performed manually (because machines are required to perform document processing and printing) and such devices are integral with the processes performed by methods herein. Further, such machine-only processes are not mere "post-solution activity" because the automated analysis of each printable document is integral with the steps of the processes described herein. Similarly, the receipt of a print job and conversion of data utilize special-purpose equipment (telecommunications equipment, routers, switches, etc.) that is distinct from a general-purpose processor. In other words, these various machines are integral with the methods herein because the methods cannot be performed without the machines (and cannot be performed by humans alone).

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further device and method herein, an article of manufacture is provided that includes a tangible computer readable medium having computer readable instructions embodied therein for performing the steps of the computer implemented methods, including, but not limited to, the methods illustrated in FIG. 2. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 2.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

In the case where the above-described series of processing is implemented with software, the program that constitutes the software may be installed from a network such as the Internet or a storage medium such as the removable medium. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM, a hard disk contained in the storage section of the disk units, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock, Tex., USA and Apple Computer Co., Cupertino, Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are not described in detail herein to keep this disclosure focused on the salient features presented. The systems and methods herein can encompass devices that print in color, monochrome, or handle color or monochrome image data. All foregoing systems and methods are specifically applicable to electrostatographic and/or xerographic machines and/or processes.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method, comprising:
    identifying, using a portable computing device, an electronic document for printing on a target image output device;
    selecting, on said portable computing device, printing and finishing instructions for said electronic document based on capabilities of said target image output device;
    transmitting, from said portable computing device to a separate document conversion service, a request to convert said electronic document to a printable format;
    receiving, from said separate document conversion service, said electronic document as a printable document and a generic print ticket for printing said printable document;
    evaluating, on said portable computing device, said generic print ticket based on said printing and finishing instructions selected for said target image output device;
    removing, with said portable computing device, said generic print ticket from said printable document;
    producing, with said portable computing device, a corrected print ticket for said printable document based on said printing and finishing instructions selected for said target image output device;
    injecting, using said portable computing device, said corrected print ticket into said printable document; and
    transmitting, from said portable computing device, said printable document with said corrected print ticket to said target image output device.

2. The method according to claim 1, further comprising:
    causing said target image output device to print said printable document with said corrected print ticket.

3. The method according to claim 1, said portable computing device comprising a smartphone or tablet.

4. The method according to claim 1, said transmitting from said portable computing device to said separate document conversion service further comprising using a wired or wireless transmission path.

5. The method according to claim 1, said transmitting from said portable computing device to said target image output device further comprising using a wired or wireless transmission path.

6. The method according to claim 1, said identifying an electronic document for printing further comprising identifying an electronic document stored on said portable computing device.

7. The method according to claim 1, said identifying an electronic document for printing further comprising identifying an electronic document stored in a repository external to said portable computing device.

8. A method, comprising:
    operatively connecting a portable computing device to a separate document conversion service;
    operating an application on said portable computing device to identify an electronic document for printing on a target image output device;
    selecting printing and finishing instructions for said electronic document based on capabilities of said target image output device, using said application;

causing said portable computing device to transmit said electronic document to said separate document conversion service, using said application;

receiving, from said separate document conversion service, said electronic document as a printable document into a graphic user interface of said portable computing device, using said application, said printable document having a generic print ticket;

evaluating said generic print ticket based on said printing and finishing instructions selected for said target image output device, using said application;

removing said generic print ticket from said printable document, using said application;

producing a corrected print ticket for said printable document based on said printing and finishing instructions selected for said target image output device, using said application;

creating a print file by combining said printable document and said corrected print ticket, using said application operating on said portable computing device, said print file having a file format usable by said target image output device; and transmitting said print file from said portable computing device to said target image output device, using said application.

9. The method according to claim 8, further comprising:
causing said target image output device to print said print file, using said application.

10. The method according to claim 8, said portable computing device comprising a smartphone or tablet.

11. The method according to claim 8, said operatively connecting said portable computing device to a separate document conversion service further comprising establishing a wired or wireless connection.

12. The method according to claim 8, said transmitting said print file from said portable computing device to said target image output device further comprising using a wired or wireless transmission path.

13. The method according to claim 8, said operating said application to identify said electronic document for printing further comprising identifying an electronic document stored on said portable computing device, using said application.

14. The method according to claim 8, said operating said application to identify said electronic document for printing further comprising identifying an electronic document stored in a repository external to said portable computing device, using said application.

15. A portable computing device, comprising:
a processor operating an application;
a graphic user interface operatively connected to said processor; and
an input/output connection connected to said processor,
said input/output connection operatively connecting said portable computing device to a separate document conversion service,
said application enabling identification of an electronic document for printing on a target image output device, using said graphic user interface,
said application enabling selection of printing and finishing instructions for said electronic document based on capabilities of said target image output device,
said application causing said portable computing device to transmit said electronic document to said separate document conversion service,
said graphic user interface receiving said electronic document as a printable document from said separate document conversion service, said printable document having a generic print ticket,
said application evaluating said generic print ticket based on said printing and finishing instructions selected for said target image output device,
said application removing said generic print ticket from said printable document,
said application producing a corrected print ticket for said printable document based on said printing and finishing instructions selected for said target image output device,
said application creating a print file by combining said printable document and said corrected print ticket, said print file having a file format usable by said target image output device,
said application causing said portable computing device to transmit said print file to said target image output device, and
said application causing said target image output device to print said print file.

16. The portable computing device according to claim 15, said input/output connection operatively connecting said portable computing device to said separate document conversion service further comprising establishing a wired or wireless connection.

17. The portable computing device according to claim 15, said application causing said portable computing device to transmit said print file to said target image output device further comprising establishing a wired or wireless transmission path.

18. The portable computing device according to claim 15, said application enabling identification of an electronic document for printing further comprising identifying an electronic document stored on said portable computing device.

19. The portable computing device according to claim 15, said application enabling identification of an electronic document for printing further comprising identifying an electronic document stored in a repository external to said portable computing device.

20. The portable computing device according to claim 15, said portable computing device comprising a smartphone or tablet.

* * * * *